US010685079B2

(12) United States Patent
Noor

(10) Patent No.: US 10,685,079 B2
(45) Date of Patent: Jun. 16, 2020

(54) PARSING NESTED JAVASCRIPT OBJECT NOTATION REQUESTS

(71) Applicant: SAP SE, Walldorf (DE)

(72) Inventor: Syed Aleemuddin Noor, Bangalore (IN)

(73) Assignee: SAP SE, Walldorf (DE)

( * ) Notice: Subject to any disclaimer, the term of this patent is extended or adjusted under 35 U.S.C. 154(b) by 324 days.

(21) Appl. No.: 15/702,285

(22) Filed: Sep. 12, 2017

(65) Prior Publication Data

US 2019/0080015 A1 Mar. 14, 2019

(51) Int. Cl.
G06F 16/00 (2019.01)
G06F 16/955 (2019.01)
G06F 16/9535 (2019.01)
H04L 29/08 (2006.01)
H04L 29/06 (2006.01)

(52) U.S. Cl.
CPC ........ *G06F 16/955* (2019.01); *G06F 16/9535* (2019.01); *H04L 67/02* (2013.01); *H04L 67/42* (2013.01)

(58) Field of Classification Search
CPC .......................... G06F 16/2455; G06F 17/2247
See application file for complete search history.

(56) References Cited

U.S. PATENT DOCUMENTS

| 8,156,156 | B2* | 4/2012 | Ferragina | G06F 16/9027 707/803 |
| 2006/0005122 | A1* | 1/2006 | Lemoine | G06F 16/2365 715/234 |
| 2009/0106298 | A1* | 4/2009 | Furusho | G06F 16/86 |
| 2017/0357693 | A1* | 12/2017 | Kumar | G06T 11/206 |

* cited by examiner

*Primary Examiner* — Hung Q Pham
(74) *Attorney, Agent, or Firm* — Mintz Levin Cohn Ferris Glovsky and Popeo, P.C.

(57) ABSTRACT

A method may include generating, based on a tree structure representative of a request, a one-dimensional array representative of the request. The generating may include in response to the tree structure having a first node that corresponds to a section, inserting, into the one-dimensional array, a first element including a numerical value that corresponds to a quantity of children nodes descending from the first node. If the first node further includes the condition, a second element including a condition may be included into the one-dimensional array. If the tree structure includes a second node that corresponds to an object, a third element including the object may be inserted into the one-dimensional array. The request may be executed based on the one-dimensional array. Related systems and articles of manufacture are also provided.

16 Claims, 6 Drawing Sheets

PARSING NESTED JAVASCRIPT OBJECT NOTATION REQUESTS

TECHNICAL FIELD

The subject matter described herein relates generally to database processing and more specifically to converting a nested JavaScript Object Notation (JSON) request into a one-dimensional array.

BACKGROUND

JavaScript Object Notation (JSON) is a text-based data interchange format used for communication between a client and a remote system. For example, a web browser may retrieve data records from a web server by sending a JSON request to the web server. The JSON request may specify the data records that the web server should return to the web browser. For instance, the JSON request may include one or more filters. Each filter may set forth at least one parameters. The web server may respond to the JSON request by returning, to the web browser, data records that satisfy the parameters set forth in the filters included in the JSON request.

SUMMARY

Systems, methods, and articles of manufacture, including computer program products, are provided for parsing nested JavaScript object notation (JSON) requests. In one aspect, there is provided a system. The system may include at least one data processor and at least one memory. The at least one memory may store instructions that result in operations when executed by the at least one data processor. The operations may include: generating, based at least on a tree structure representative of a request, a one-dimensional array representative of the request, the generating of the one-dimensional array comprising: in response to the tree structure having a first node that corresponds to a section in the request, inserting, into the one-dimensional array, a first element including a numerical value that corresponds to a quantity of children nodes descending from the first node, in response to the first node including a condition that joins the section with another section, inserting, into the one-dimensional array, a second element including the condition, and in response to the tree structure having a second node that corresponds to an object in the request, inserting, into the one-dimensional array, a third element including the object; and executing the request based at least on the one-dimensional array representative of the request.

In some variations, one or more features disclosed herein including the following features can optionally be included in any feasible combination. The request may be a JavaScript Object Notation (JSON) request. The section may be a grouping that includes the object and another object. The tree structure may include a third node corresponding to the other object. The generating of the one-dimensional array may further include inserting, into the one-dimensional array, a fourth element that includes the other object.

In some variations, the section may be a grouping that includes the object and another section. The tree structure may a third node corresponding to the other section. The generating of the one-dimensional array may further include inserting, into the one-dimensional array, a fourth element that includes a numerical value that corresponds to a quantity of children nodes descending from the third node.

In some variations, the one-dimensional array may be parsed prior to executing the request based on the one-dimensional array. The parsing may include: determining that the first element includes the numerical value; and in response to the determination that the first element includes the numerical value, combining, based at least on the numerical value, a quantity of elements that are subsequent to the first element in the one-dimensional array, each of the quantity of elements including objects, and the quantity of elements corresponding to the numerical value. A processed object may be generated by at least combining, based at least on the numerical value, the object included in the third element and another object included in a fourth element from the one-dimensional array. The first element, the third element, and the fourth element may be replaced with a fifth element that includes the processed object. The object and the other object may be combined with the condition in the second element to form the processed object in response to the second element being interposed between the third element and the fourth element. The object may be a grouping that includes a first filter. The first filter may be associated with a parameter for retrieving, from a remote system, one or more data records. The grouping may further include a second filter. The first filter and the second filter may be joined based on a first condition.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

As noted, a client may retrieve data records from a remote system by sending a JavaScript Object Notation (JSON) request to the remote system. The JSON request may include nested filters in which one or more filters operate on data records output by one or more other filters. A tree structure may be used to represent the JSON request because the nested filters included in the JSON request may be reflected as parent nodes and children nodes in the tree structure. Meanwhile, the remote system may execute the JSON request based on the tree structure representation of the JSON request. However, parsing the tree structure representation of the JSON request may require excessive time and/or computing resources, particularly if the JSON request is complex and includes many deeply nested filters. Thus, in some example embodiments, the tree structure representation of the JSON request may be converted into a one-dimensional array representation of the JSON request. The JSON request may be executed based on the one-dimensional array instead of the tree structure, thereby reducing the time and/or the computing resources required to execute the JSON request.

Figure 1:
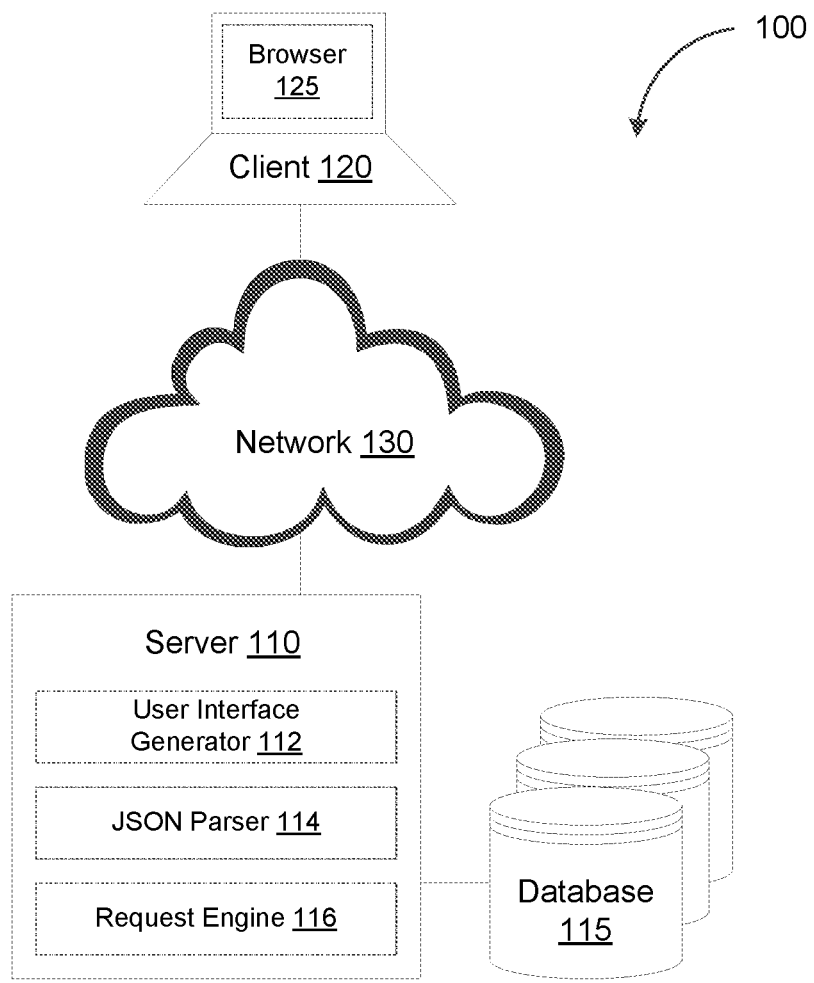
FIG. 1 depicts a system diagram illustrating a remote communications system, in accordance with some example embodiments.

FIG. 1 depicts a system diagram illustrating a remote communications system 100, in accordance with some example embodiments. Referring to FIG. 1, the remote communications system 100 may include a server 110 and a client 120. The server 110 and the client may be communicatively coupled over a network 130, which may be a wired and/or wireless network including, for example, a wide area network (WAN), a local area network (LAN), a public land mobile network (PLMN), the Internet, and/or the like.

As shown in FIG. 1, the server 110 may include a user interface generator 112, a JSON parser 114, and a request engine 116. Furthermore, the server 110 may be coupled with a database 115, which may be any type of database including, for example, an in-memory database, a relational database, a non-SQL (NoSQL) database, and/or the like. The server 110 may be configured to provide access to data records held in the database 115. For example, the client 120 may send, to the server 110, a JSON request. In some example embodiments, the server 110, for example the user interface generator 112, may generate a graphic user interface (GUI), which may be displayed at the client 120, for example, by a browser 125. The JSON request may be configured and/or sent to the server 110 via the graphic user interface.

In some example embodiments, the JSON request from the client 120 may include one or more filters identifying which data records from the database 115 should be returned to the client 120. As noted, the one or more filters may each set forth at least one parameter. Thus, the server 110, for example the request engine 116, may execute the JSON request by at least retrieving, from the database 115, data records that satisfy the parameters set forth in the filters included in the JSON request. The server 110 may further send these data records to the client 120.

A tree structure may be used to represent the JSON request from the client 120. For instance, the nested filters that are present in the JSON request may be reflected as parent nodes and children nodes in the tree structure representation of the JSON request. However, as noted, executing the JSON request based on the tree structure representation of the JSON request may require excessive time and computing resources. For instance, Table 1 depicts programming code for a JSON request having a plurality of nested filters.

TABLE 1

```
{
  "conditions": {
    "section": [
      {
        "SubSection": [
          {
            "filtercards": [
              {
                "modelName": "Basic Data",
                "attributes": [
                  {
                    "Filter": "Students who are Non - residents of the current country."
                  }
                ]
              }
            ]
          }
        ]
      },
      {
        "conditionWithPreviousSection": "and",
        "SubSection": [
          {
            "filtercards": [
              {
                "name": "Student Enrollment",
                "attributes": [
                  {
                    "Filter": "Students enrolled in high failure class "
                  }
                ]
              },
              {
                "ConditionWithPreviousFilterCard": "OR",
                "name": "Student Enrollments",
                "attributes": [
                  {
                    "Filter": "Students\nenrolled in class which have high waitlist count"
                  }
                ]
              }
            ]
          }
        ]
      },
```

TABLE 1-continued

```
{
    "conditionWithPreviousSection": "and",
    "filtercards": [
        {
            "name": "Student Grades",
            "attributes": [
                {
                    "Filter": "(Grade='D')"
                },
                {
                    "Filter": "or(Grade='E')"
                },
                {
                    "Filter": "or (Grader='F')"
                }
            ]
        }
    ]
}
```

As such, according to some example embodiments, the server 110, for example, the JSON parser 114, may be configured to convert the tree structure representation of the JSON request into a one-dimensional array. That is, the server 110 may generate a one-dimensional array based on the tree representation of the JSON request. The server 110 may further execute the JSON request based on the one-dimensional array representation of the JSON request instead of the tree structure representation of the JSON request. It should be appreciated that executing the JSON request based on the one-dimensional array representation of the JSON request may require less time and/or computing resources than executing the same JSON request based on the tree structure representation of the JSON request.

Figure 2A:
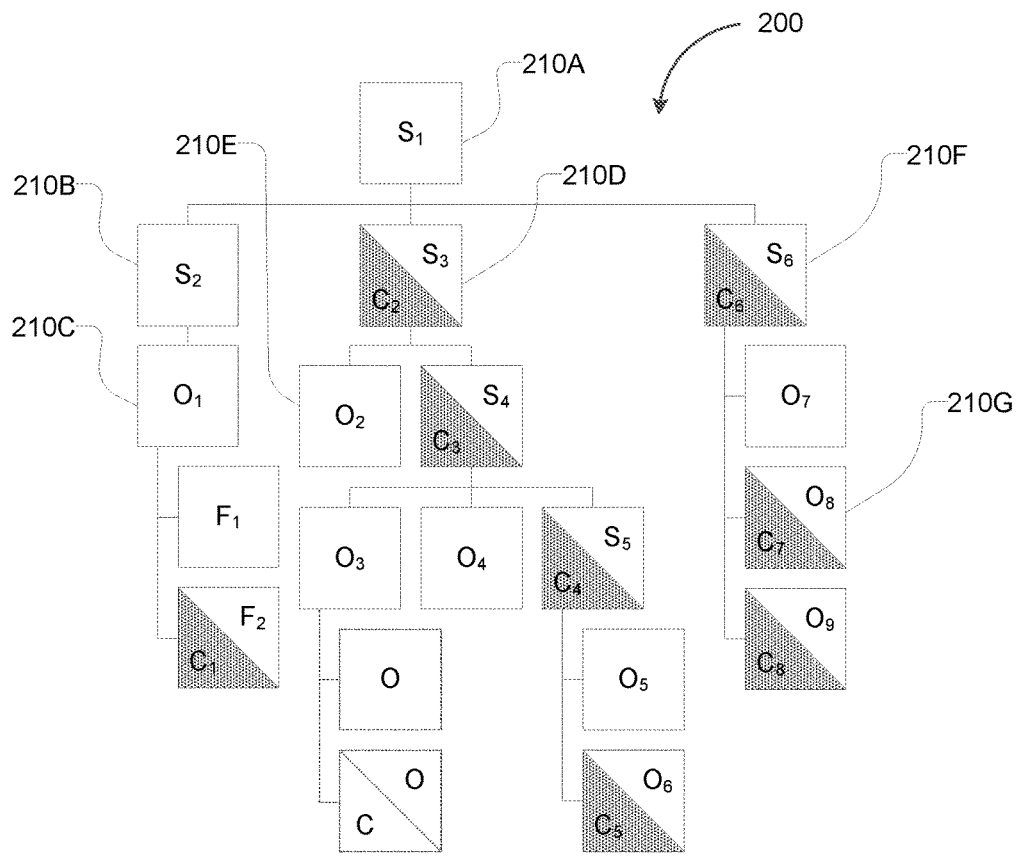
FIG. 2A depicts a tree structure representative of a JSON request, in accordance with some example embodiments.

To further illustrate, FIG. 2A depicts a tree structure 200 representative of a JSON request, in accordance with some example embodiments. Referring to FIG. 2A, the tree structure 200 may include a plurality of nodes including, for example, nodes that correspond to one or more sections, objects, filters, and/or conditions. As used herein, an object may refer to a grouping of one or more filters. One or more objects may be further grouped into a section. Furthermore, different sections may be nested such that one section may include one or more sub-sections. This nesting of sections, objects, and/or filters may be reflected in the tree structure 200 representative of the JSON request.

For example, as shown in FIG. 2A, the tree structure 200 may include nodes that correspond to a plurality of filters including, for example, a first filter $F_1$ and a second filter $F_2$. The tree structure 200 may also include nodes that correspond to a plurality of objects including, for example, a first object $O_1$, a second object $O_2$, a third object $O_3$, a fourth object $O_4$, a fifth object $O_5$, a sixth object $O_6$, a seventh object $O_7$, an eighth object $O_8$, and a ninth object $U_9$. Furthermore, the tree structure 200 may include nodes that correspond to a plurality of sections including, for example, a first section $S_1$, a second section $S_2$, a third section $S_3$, a fourth section $S_4$, a fifth section $S_5$, and a sixth section $S_6$.

It should be appreciated that the JSON request may be a nested JSON request because the JSON request may include one or more filters that are nested within an object that may be further nested within a sub-section nested within a section. As noted, this nesting may be reflected in the tree structure 200 because the nodes that correspond to filters may be children nodes descending from a parent node that corresponds to an object. Meanwhile, the nodes that correspond to objects may further be children nodes that descend from a parent node corresponding to a section.

As used herein, a filter, such as the first filter $F_1$ or the second filter $F_2$, may set forth one or more parameters. Applying a filter to a plurality of data records may generate a subset of data records that satisfy the parameters set forth in the filter. One or more filters may be grouped into a single object. For example, as shown in FIG. 2A, the first filter $F_1$ and the second filter $F_2$ may be a part of the first object $O_1$. Although not shown, each of the second object $O_2$, the third object $O_3$, the fourth object $O_4$, the fifth object $O_5$, the sixth object $O_6$, the seventh object $O_7$, the eighth object $O_8$, and/or the ninth object $O_9$ may also include one or more filters.

In some example embodiments, one filter may be joined with another filter based on one or more conditions. These conditions may be, for example, Boolean operators such as AND, OR, NOT, and/or the like. To further illustrate, as shown in FIG. 2A, a first condition $C_1$ may be applied to join the first filter $F_1$ and the second filter $F_2$, thereby combining the parameters set forth in each filter. Thus, if the first filter $F_1$ sets forth a first parameter $p_1$, the second filter $F_2$ sets forth a second parameter $p_2$, and the first condition $C_1$ is the AND operator, then the first object $O_1$ may select data records satisfying both the first parameter $p_1$ and the second parameter $p_2$ (e.g., $p_1$ AND $p_2$). Alternately and/or additionally, if the first filter $F_1$ sets forth a first parameter $p_1$, the second filter $F_2$ sets forth a second parameter $p_2$, and the first condition $C_1$ is the NOT operator, then the first object $O_1$ may select data records that satisfy the first parameter $p_1$ but not the second parameter $p_2$ (e.g., $p_1$ NOT $p_2$).

Referring again to FIG. 2A, a section may include one or more objects and/or other sections. For example, as shown in FIG. 2A, the first section $S_1$ may include the second section $S_2$, the third section $S_3$, and the sixth section $S_6$. The second section $S_2$ may further include the first object $O_1$ while the sixth section $S_6$ may include the seventh object $O_7$, the eighth object $O_8$, and/or the ninth object $O_9$. Meanwhile, the third section $S_3$ may further include both the second object $O_2$ and the fourth section $S_4$, which may further include the third object $O_3$, the fourth object $O_4$, and the fifth section $S_5$. One object may be joined with another object based on one or more conditions. For instance, a fifth condition $C_5$ may be applied to join the fifth object $O_5$ and the sixth object $O_6$, thereby combining the parameters set forth in the filters included in each object. Thus, to further illustrate, if the fifth object $O_5$ requires the satisfaction of both the first parameter $p_2$ and the second parameter $p_2$, the sixth object $O_6$ requires satisfaction of either a third parameter $p_3$ or a fourth parameter $p_4$, and the fifth condition $C_5$ is the NOT operator, then the fourth section $S_4$ may require satisfaction of both the first parameter $p_1$ and the second parameter $p_2$ but not the satisfaction of either the third parameter $p_3$ or the fourth parameter $p_4$ (e.g., ($p_1$ AND $p_2$) NOT ($p_3$ OR $p_4$)).

Alternatively and/or additionally, an object may also be joined with a section based on one or more conditions. For example, a third condition $C_3$ may be applied to join the second object $O_2$ and the fourth section $S_4$. Joining the second object $O_2$ and the fourth section $S_4$ may combine, based on the third condition $C_3$, the parameters set forth by the filters included in the second object $O_2$ and the parameters set forth by the filters included in the fourth section $S_4$. Furthermore, as shown in FIG. 2A, one section may also be joined with another section based on a condition. For example, a second condition $C_2$ may be applied to join the third section $S_3$ with the fourth section $S_4$ while a sixth condition $C_6$ may be applied to further join the third section $S_3$ with the sixth section $S_6$.

Figure 2B:
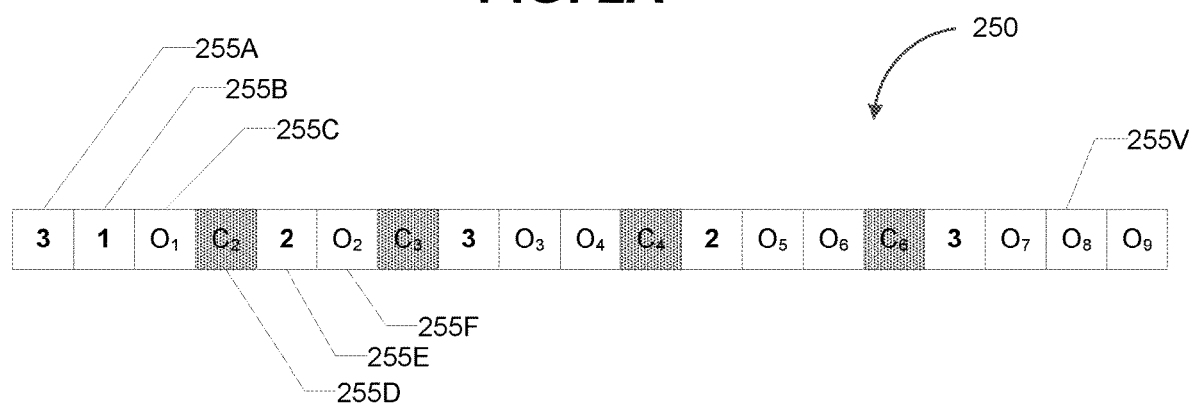
FIG. 2B depicts a one-dimensional array representative of a JSON request, in accordance with some example embodiments.

According to some example embodiments, the server 110, for example the JSON parser 114, may be configured to parse the JSON request 210 by at least generating, based at least on the tree structure 200, a corresponding one-dimensional array 250. FIG. 2B depicts the one-dimensional array 250 representative of the JSON request 210, in accordance with some example embodiments. Referring to FIG. 2B, the one-dimensional array 250 may include a plurality of elements corresponding to numerical (e.g., integer) values, objects, and/or conditions. To generate the one-dimensional array 250, the server 110 may iterate over the tree structure 200, starting at a root node of the tree structure 200. The server 110 may determine whether a node corresponds to a section or an object. Where the server 110 encounters a node that corresponds to a section, the server 110 may determine a quantity of children nodes descending from the node and insert that quantity as an element within the one-dimensional array 250. For example, the server 110 began traversing the tree structure 200 at a first node 210A at the root of the tree structure 200 and determine that the first node 210A corresponds to the first section $S_1$. Accordingly, the server 110 may determine the quantity of children nodes that descend from the first node 210A and insert that quantity as a first element 255A in the one-dimensional array 250. The server 110 may continue to traversing the tree structure 200 and encounter a second node 210B, which may be a leftmost child node of the first node 210A. Here, the server 110 may determine that the second node 210B corresponds to the second section $S_2$. As such, the server 110 may determine the quantity of children nodes that descend from the second node 210B and insert that quantity as a second element 250B in the one-dimensional array 250.

Alternatively and/or additionally, where the server 110 encounters a node that corresponds to an object, the server may insert the object as an element within the one-dimensional array 250. For example, once the server 110 has inserted the second element 250B into the one-dimensional array 250, the server 110 may continue to traverse the tree structure 200 and encounter a third node 210C, which may be a child node of the second node 210B. The server 110 may determine that the third node 210C corresponds to the first object $O_1$. As such, the server 110 may insert the first object $O_1$ into the one-dimensional array 250 as a third element 255C. It should be appreciated that inserting the first object $O_1$ may include inserting the filters and/or the conditions included in the first object $O_1$. Accordingly, the third element 255C may include the parameters set forth in both the first filter $F_1$ or the second filter $F_2$ as well as the first condition $C_1$ joining the first filter $F_1$ or the second filter $F_2$.

In instances where the server 110 encounters a node that includes both an object and a condition that joins the object to another object, the server 110 may be configured to insert, into the one-dimensional array 250, an element corresponding to the object that also includes the condition. For example, in traversing the tree structure 200, the server 110 may encounter a seventh node 210G, which may be one of the children nodes that descend from the sixth node 210F. The server 110 may determine that the seventh node 210G corresponds to the eighth object $O_8$ as well as a seventh condition $C_7$ joining the seventh object $O_7$ and the eighth object $O_7$. Accordingly, the server 110 may insert, into the one-dimensional array 250, a twenty-second element 255V. The twenty-second element 255V may include the eighth object $O_8$ as well as the seventh condition $C_7$.

Where the server 110 encounters a node that includes a condition joining together two adjacent sections, the server 110 may also insert the condition as an element within the one-dimensional array 250. For example, once the server 110 has inserted the third element 255C into the one-dimensional array 250, the server 110 may continue to traverse the tree structure 200 and encounter a fourth node 210D, which may be a next child node of the first node 210A. The server 110 may determine that the fourth node 210D includes the second condition $C_2$, which joins the second section $S_2$ and the third second $S_3$. Thus, the server 110 may insert the second condition $C_2$ as a fourth element 250D in the one-dimensional array 250. The second condition $C_2$ may be a Boolean operators such as, for example, AND, OR, NOT, and/or the like. As such, the fourth element 250D may include an indication of the Boolean operator (e.g., AND, OR, NOT, and/or the like) corresponding to the second condition $C_2$.

The server 110 may continue to traverse the tree structure 250 until the server 110 has traversed every node in the tree structure 200. For example, after inserting the fourth element 250D into the one-dimensional array 250, the server 110 may further determine that the fourth node 210D corresponds to the third section $S_3$. As such, the server 110 may determine a quantity of children nodes that descend from the fourth node 210D and insert that as a fifth element 255E in the one-dimensional array 250. Thereafter, the server 110 may continue to traverse the tree structure 250 and encounter a fifth node 210E. Upon determining that the fifth node 210E corresponds to the second object $O_2$, the server 110 may insert the second object $O_2$ as a sixth element 255F in the one-dimensional array 250. As noted, inserting the second object $O_2$ may include inserting, as part of the sixth element 255F, the filters and/or the conditions (not shown) included in the second object $O_2$.

Figure 2C:
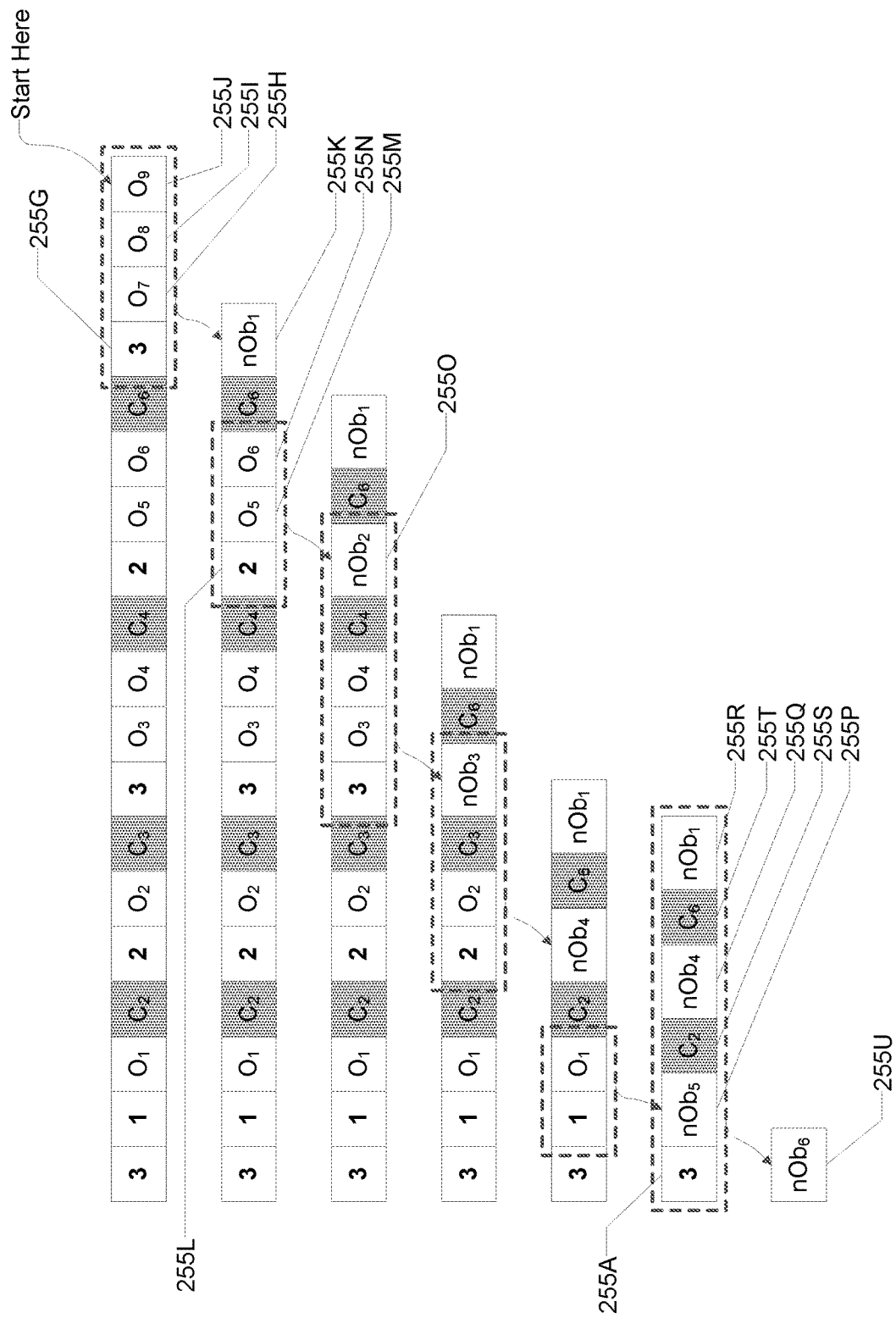
FIG. 2C depicts a parsing of a one-dimensional array representative of a JSON request, in accordance with some example embodiments.

FIG. 2C depicts a parsing of the one-dimensional array representative of the JSON request, in accordance with some example embodiments. According to some example embodiments, the server 110, for example the JSON parser 114, may further parse the one-dimensional 250 representative of the JSON request. For example, as shown in FIG. 2C, the server 110 may parse the one-dimensional array 250 in a reverse direction, thus starting from an element that was last added to the one-dimensional array 250. The server 110 may traverse the one-dimensional array 250 until the server 110 encounters an element, such as a seventh element 255G, associated with a numerical value. This numerical value may correspond to a quantity of children nodes descending from a sixth node 210F in the tree structure 200 that corresponds to the sixth section $S_6$.

Based on this numerical value, the server 110 may combine a corresponding quantity of elements subsequent to the seventh element 255G that store objects and/or processed objects. For instance, based on the seventh element 255G being associated with the numerical value "3," the server 110 may combine the three elements (e.g., an eighth element 255H, a ninth element 255I, and a tenth element 255J) including objects and/or processed objects that are subsequent to the seventh element 255G. Here, the server 110 may combine the seventh object $O_7$, the eighth object $O_8$, and/or the ninth object $O_9$ to form a first processed object $nOb_1$. As shown in FIG. 2C, the server 110 may replace the seventh element 255G, the eighth element 255H, the ninth element 255I, and the tenth element 255J with an eleventh element 255K corresponding to the first processed object $nOb_1$. As used herein, a processed object, such as the first processed object $nOb_1$, may include a combination of all of the filters and/or conditions associated with the objects that are combined to form the processed object. Thus, the first processed object $nOb_1$ may include all of the filters and/or conditions associated with the seventh object $O_7$, the eighth object $O_8$, and/or the ninth object $O_9$.

The server 110 may continue to traverse the one-dimensional array 250 until the server 110 encounters another element, such as a twelfth element 255L, that includes a numerical value. Again, the server 110 may form a second processed object $nOb_2$ by at least combining, based on the numerical value, the fifth object $O_5$ included in a thirteenth element 255M and the sixth object $O_6$ included in a fourteenth element 255N. Furthermore, the server 110 may replace the twelfth element 255L, the thirteenth element 255M, and the fourteenth element 255N with a fifteenth element 255O that includes the second processed object $nOb_2$.

It should be appreciated that based on the numerical value included in one element of the one-dimensional array 250, the server 110 may be required to combine a quantity of elements that are not necessarily consecutive. Thus, in some example embodiments, when the server 110 is combining elements from the one-dimensional array 250 that includes objects and/or processed objects, the combination may include any intervening elements that include conditions. For example, when the server 110 encounters the first element 255A, the server 110 may combine, based on the numerical value included in the first element 255A, a corresponding of quantity of ensuing elements that include objects and/or processed objects. For example, the server 110 may combine a sixteenth element 255P including a fifth processed object $nOb_5$, a seventeenth element 255Q including a fourth processed object $nOb_4$, and an eighteenth element 255R including the first processed object $nOb_1$. In doing so, the server 110 may further combine the intervening conditions including, for example, the second condition $C_2$ included in a nineteenth element 255S and the sixth condition $C_6$ included in the twentieth element 255T. The fifth processed object $nOb_5$, the fourth processed object $O_4$, the first processed object $nOb_1$, the second condition $C_2$, and the sixth condition $C_6$ may be combined to form a sixth processed object $nOb_6$. Furthermore, the server 110 may replace the sixteenth element 255P, the seventeenth element 255Q, the eighteenth element 255R, the nineteenth element 255S, and the twentieth element 255T with a twenty-first element 255U, which includes the sixth processed object $nOb_6$. It should be appreciated that the sixth processed object $nOb_6$ may form a parsed array that is representative of all of the nested filters included the initial JSON request and that the server 110 may execute the JSON request based on the sixth processed object $nOb_6$ instead of the tree structure 250 representative of the JSON request.

To further illustrate, suppose the first processed object $nOb_1$ selects data records that satisfy both the first parameter $p_1$ and the second parameter $p_2$ (e.g., $p_1$ AND $p_2$). The fourth processed object $nOb_4$ may select data records that satisfy either the third parameter $p_3$ or the fourth parameter $p_4$ (e.g., $p_3$ OR $p_4$). Meanwhile, the fifth processed object $nOb_4$ may select data records that satisfy a fifth parameter $p_5$ but not a sixth parameter $p_6$ (e.g., $p_5$ NOT $p_6$). Further suppose that the second condition $C_2$ may be an AND operator and the sixth condition $C_6$ may be an OR operator. In this case, the sixth processed object $nOb_6$ may select data records that satisfy the following: (($p_1$ AND $p_2$) AND (e.g., $p_3$ OR $p_4$)) OR (e.g., $p_2$ NOT $p_6$).

Figure 3:
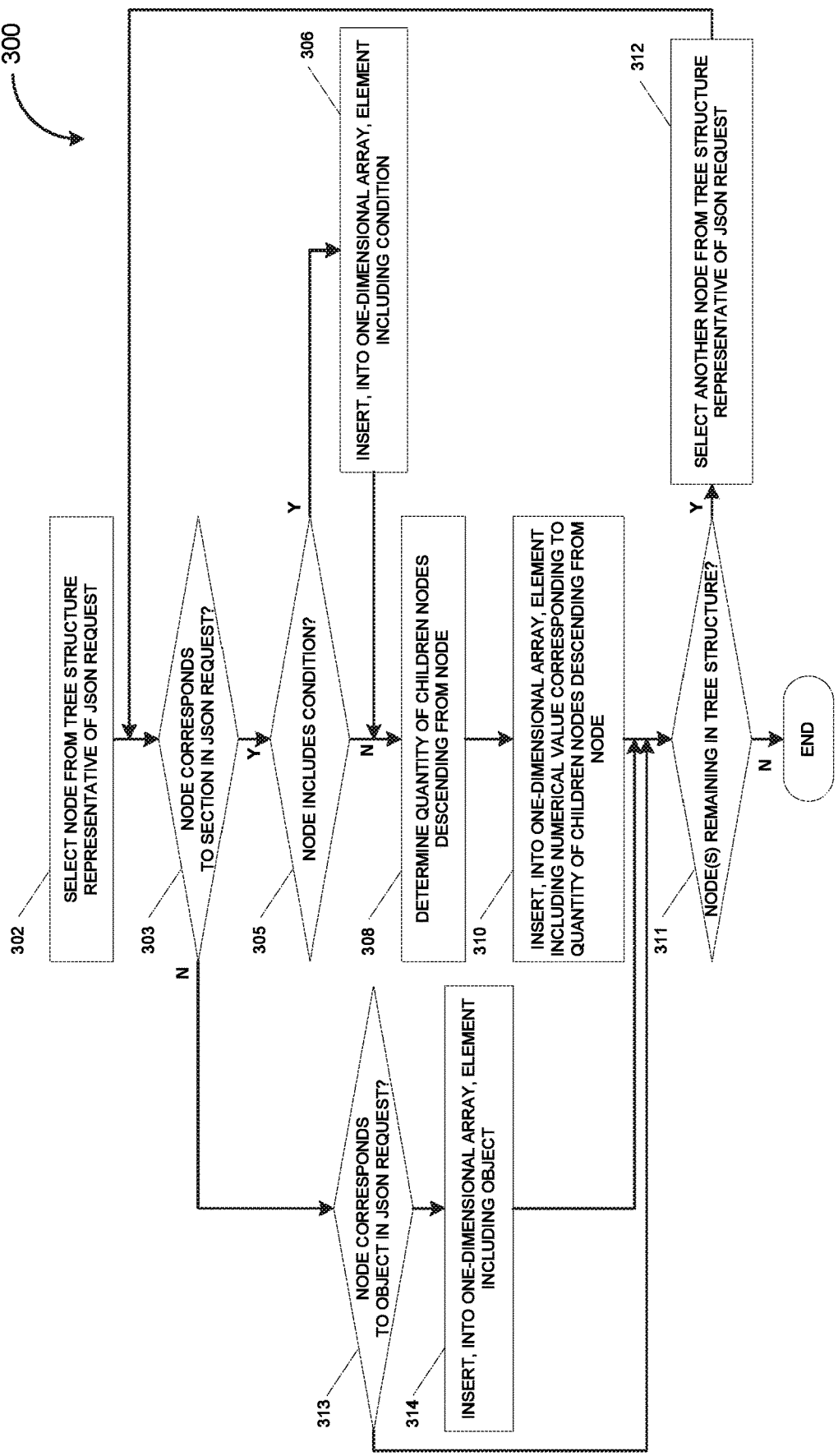
FIG. 3 depicts a flowchart illustrating a process for converting a tree structure representation of a JSON request, in accordance with some example embodiments.

FIG. 3 depicts a flowchart illustrating a process 300 for converting a tree structure representation of a JSON request, in accordance with some example embodiments. Referring to FIGS. 1-3, the process 300 may be performed by the server 100, for example, by the JSON parser 114. For instance, the server 100 may perform the process 300 in order to generate, based on the tree structure 200, the corresponding one-dimensional array 250.

At 302, the server 110 may select a node from the tree structure 250 representative of the JSON request. For example, the server 110 may began traversing the tree structure 200 at the first node 210A, which may be at the root of the tree structure 200. The server 110 may continue to traverse the tree by selecting subsequent nodes from the tree structure 200 including, for example, the second node 210B, the third node 210C, the fourth node 210D, the fifth node 210E, the sixth node 210F, and/or the seventh node 210G.

At 303, the server 110 may determine whether the node corresponds to a section in the JSON request. If the server 110 determines that the node corresponds to a section, the server may, at 305, further determine whether the server 110 may determine whether the node includes a condition. If the server 110 determines that the node includes a condition, then the server 110 may, at 306, insert an element including the condition into the one-dimensional array 250. For example, when the server 110 encounters the fourth node 210D, the server 110 may determine that the fourth node 210D includes the second condition $C_2$. As such, the server 110 may insert, into the one-dimensional array 250, the fourth element 255D, which includes the second condition $C_2$. Once the server 110 inserts the element including the condition into the one-dimensional array 250, the process 300 may continue at operation 308. Alternatively and/or additionally, the process 300 may also continue at operation 308 if the server 110 determines, at operation 305, that the node does not include a condition.

At 308, the server 110 may determine a quantity of children nodes descending from the node. Furthermore, at 310, the server 110 may insert, into the one-dimensional array 250, an element including a numerical value corresponding to the quantity of children nodes descending from the node. To further illustrate, when the server 110 encounters the first node 210A, the server 110 may determine that the first node 210A corresponds to the first section $S_1$. As such, the server 110 may determine the quantity of children nodes descending from the first node 210A. The server 110 may further insert, into the one-dimensional array 250, the first element 255A, which includes the numerical value "3" corresponding to the quantity of children nodes descending from the first node 210A. Once the server 110 inserts the element including the numerical value into the one-dimensional array 250, the process 300 may continue at operation 311.

Alternatively and/or additionally, the server 110 may determine, at 303, that the node does not correspond to a section in the JSON request. As such, the process 300 may continue at operation 313 where the server 110 determines whether the node correspond to an object in the JSON request. If the server 110 determines that the node corresponds to an object, the server 110 may, at 314, insert an element including the object into the one-dimensional array 250. For example, when the server 110 encounters the third node 210C, the server 110 may determine that the third node 210C corresponds to the first object $O_1$. Accordingly, the server 110 may insert the third element 255C, which includes the first object $O_1$, into the one-dimensional array 250. Alternatively and/or additionally, if the server 110 determines that the node does not correspond to an object, the process 300 may continue at operation 311.

At 311, the server 110 may determine if there are one or more nodes remaining in the tree structure 250. If the server 110 has traversed the entire tree structure 250, the server 110 may determine that there are no nodes remaining in the tree structure 250. As such, the process 300 may terminate. Alternatively and/or additionally, if the server 110 determines that that are one or more nodes remaining in the tree structure 250, the server 110 may, at 312, select another node from the tree structure 250 representative of the JSON request. Here, the process 300 may resume at operation 303 where the server 110 again determines whether the node corresponds to a section in the JSON request.

Figure 4:
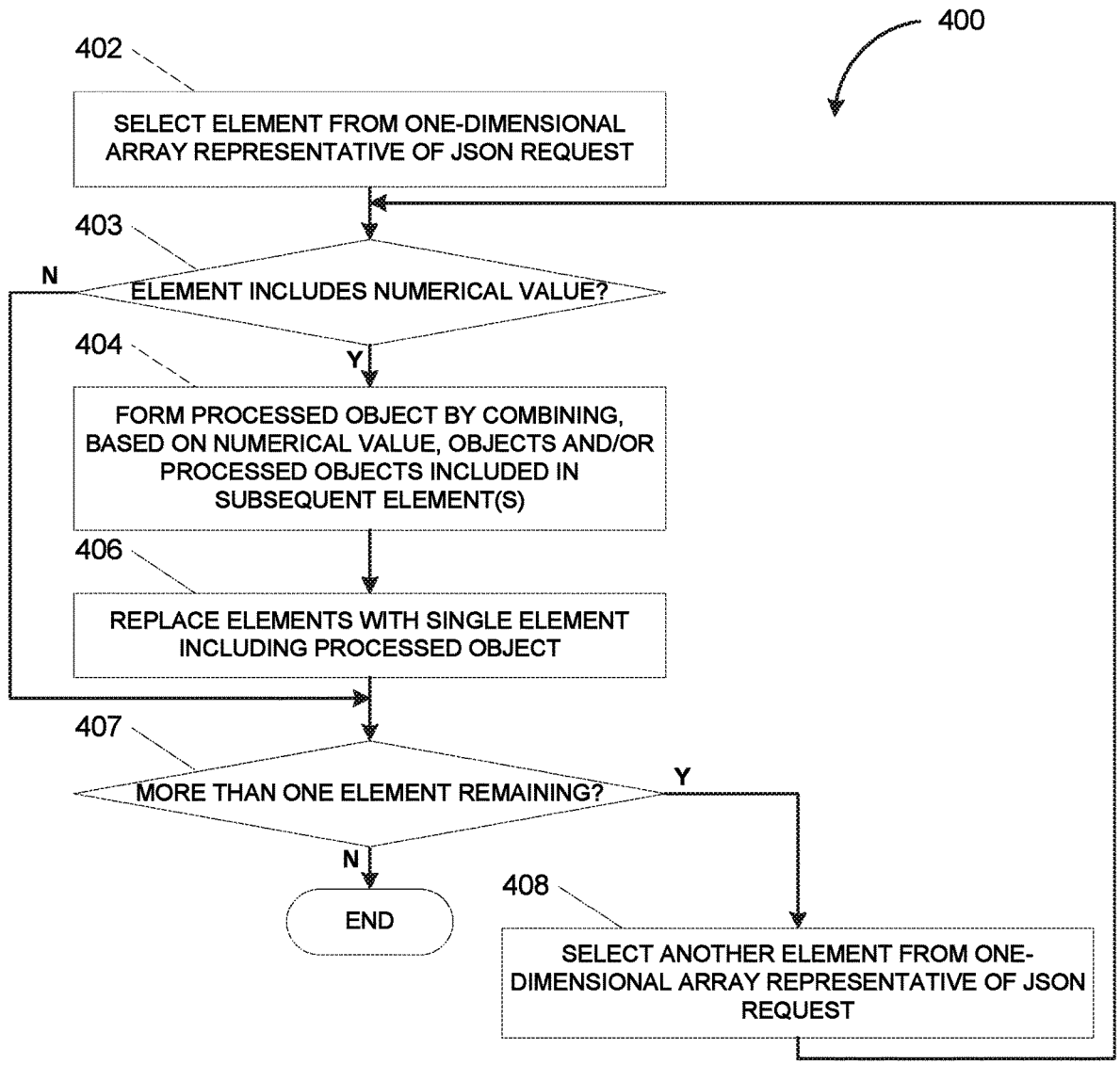
FIG. 4 depicts a flowchart illustrating a process for parsing a one-dimensional array representative of a JSON request, in accordance with some example embodiments.

FIG. 4 depicts a flowchart illustrating a process 400 for parsing a one-dimensional array representative of a JSON request, in accordance with some example embodiments. Referring to FIGS. 1-4, the process 400 may be performed by the server 100, for example, by the JSON parser 114. For instance, the server 100 may perform the process 400 in order to further parse the one-dimensional array 250 such that the JSON request may be executed based on the one-dimensional array 250.

At 402, the server 110 may select an element from the one-dimensional array 250 representative of a JSON request. For instance, in some example embodiments, the server 110 may parse the one-dimensional array 250 in a reverse direction, thus starting from the tenth element 255J.

At 403, the server 110 may determine whether the element includes a numerical value. If the server 110 determines that the element includes a numerical value, then the server 110 may, at 404, form a processed object by combining, based at least on the numerical value, objects and/or processed objects included in one or more subsequent elements. Furthermore, the server 110 may, at 406, replace the elements with a single element that includes the processed object formed at operation 404. Upon forming the processed object and replacing the elements with a single element that includes processed object, the process 400 may continue at 407. Alternatively and/or additionally, the process 400 may also continue at 407 if the server 110 determines that the element does not include a numerical value.

For example, when the server 110 determines that the seventh element 255G includes the numerical value "3," the server 110 may combine, based on that numerical value, the objects and/or processed objects included in the three elements that follow the seventh element 255G. These three elements that include objects and/or processed objects may not necessarily be consecutive, in which case combining the three elements may include combining any intervening elements that include conditions. As shown in FIG. 2C, the server 110 may combine, based at least on the numerical value "3" included in the seventh element 255G, the seventh object $O_7$ included in the eighth element 255H, the eighth object $O_8$ included in the ninth element 255I and the ninth object $O_9$ included in the tenth element 255J to form the first processed object $nOb_1$. The server 110 may further replace the seventh element 255G, the eighth element 255H, the ninth element 255I, and the tenth element 255J with the eleventh element 255K, which includes the first processed object $nOb_1$.

At 407, the server 110 may determine whether there is more than one element remaining in the one-dimensional array 250. If the server 110 determines that there is not more than one element remaining in the one-dimensional array 250, the process 400 may terminate. For example, if one-dimensional array 250 may be fully parsed if the twenty-first element 255U is the only remaining element in the one-dimensional array 250. At this point, the server 110 may execute the corresponding JSON request based on the parsed one-dimensional array 250 including, for example, the sixth processed object $nOb_6$ included in the twenty-first element 255U. Alternatively and/or additionally, if the server 110 determines that there is more than one element remaining in the one-dimensional array 250, the server 110 may, at 408, select another element from the one-dimensional array 250 representative of the JSON request. Here, the server 110 may continue to traverse the one-dimensional array 250. As such, upon selecting the other element at operation 408, the process 400 may continue at operation 403 where the server 110 again determines whether that element includes a numerical value.

Figure 5:
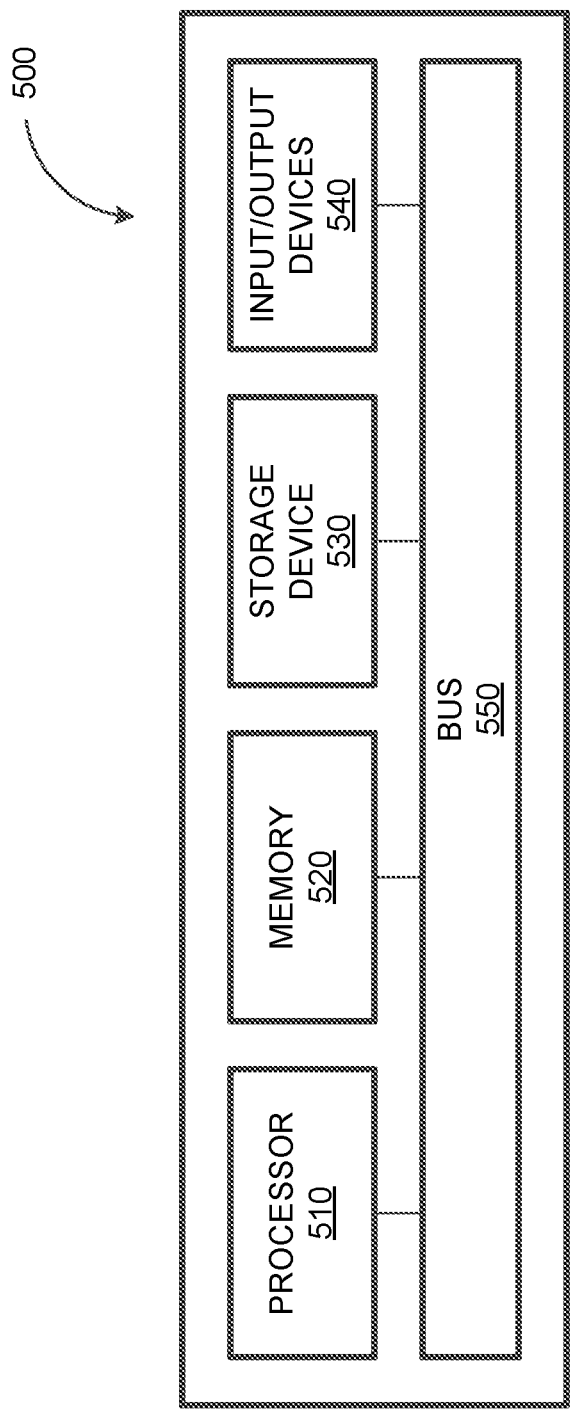
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the database system 100, the multitenant database system 200, and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the database system 100 and/or the multitenant database system 200. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning as an add-in for a spreadsheet and/or other type of program) or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, result in operations comprising:
   generating, based at least on a tree structure representative of a request, a one-dimensional array representative of the request, the generating of the one-dimensional array includes iterating over a plurality of nodes comprising the tree structure, and each iteration over the tree structure comprising:
   in response to the tree structure having a first node that corresponds to a section in the request, inserting, into the one-dimensional array, a first element including a numerical value that corresponds to a quantity of children nodes descending from the first node,
   in response to the first node including a condition that joins the section with another section, inserting, into the one-dimensional array, a second element including the condition, and
   in response to the tree structure having a second node that corresponds to a first object in the request, inserting, into the one-dimensional array, a third element including the first object;

parsing the one dimensional array, the parsing includes determining that the first element includes the numerical value, the parsing further includes responding to determining that the first element includes the numerical value by at least combining, based at least on the numerical value, a quantity of elements including objects that follow the first element in the one-dimensional array, and the quantity of elements corresponding to the numerical value; and executing the request based at least on the parsed one-dimensional array representative of the request.

2. The system of claim 1, wherein the request comprises a JavaScript Object Notation (JSON) request.

3. The system of claim 1, wherein the section comprises a grouping that includes the first object and a second object, wherein the tree structure includes a third node corresponding to the second object, and wherein the generating of the one-dimensional array further comprises inserting, into the one-dimensional array, a fourth element that includes the second object.

4. The system of claim 1, wherein the section comprises a grouping that includes the first object and another section, wherein the tree structure includes a third node corresponding to the other section, and wherein the generating of the one-dimensional array further comprises inserting, into the one-dimensional array, a fourth element that includes a numerical value that corresponds to a quantity of children nodes descending from the third node.

5. The system of claim 1, further comprising:
generating a processed object by at least combining, based at least on the numerical value, the first object included in the third element and a second object included in a fourth element from the one-dimensional array; and
replacing the first element, the third element, and the fourth element, with a fifth element that includes the processed object.

6. The system of claim 5, wherein the first object and the second object are combined with the condition in the second element to form the processed object in response to the second element being interposed between the third element and the fourth element.

7. The system of claim 5, wherein the first object comprises a grouping that includes a first filter, and wherein the first filter is associated with a parameter for retrieving, from a remote system, one or more data records.

8. The system of claim 7, wherein the grouping further includes a second filter, and wherein the first filter and the second filter are joined based on a first condition.

9. A computer-implemented method, comprising:
generating, by at least one data processor, a one-dimensional array representative of the request, the one-dimensional array generated based at least on a tree structure representative of a request, and the generating of the one-dimensional array comprising:
in response to the tree structure having a first node that corresponds to a section in the request, inserting, into the one-dimensional array, a first element including a numerical value that corresponds to a quantity of children nodes descending from the first node,
in response to the first node including a condition that joins the section with another section, inserting, into the one-dimensional array, a second element including the condition, and in response to the tree structure having a second node that corresponds to a first object in the request, inserting, into the one-dimensional array, a third element including the first object;

parsing, by the at least one data processor, the one dimensional array, the parsing includes determining that the first element includes the numerical value, the parsing further includes responding to determining that the first element includes the numerical value by at least combining, based at least on the numerical value, a quantity of elements that are subsequent to the first element in the one-dimensional array, each of the quantity of elements including objects, and the quantity of elements corresponding to the numerical value; and executing, by the at least one data processor, the request based at least on the parsed one-dimensional array representative of the request.

10. The method of claim 9, wherein the request comprises a JavaScript Object Notation (JSON) request.

11. The method of claim 9, wherein the section comprises a grouping that includes the first object and a second object, wherein the tree structure includes a third node corresponding to the second object, and wherein the generating of the one-dimensional array further comprises inserting, into the one-dimensional array, a fourth element that includes the second object.

12. The method of claim 9, wherein the section comprises a grouping that includes the first object and another section, wherein the tree structure includes a third node corresponding to the other section, and wherein the generating of the one-dimensional array further comprises inserting, into the one-dimensional array, a fourth element that includes a numerical value that corresponds to a quantity of children nodes descending from the third node.

13. The method of claim 9, further comprising:
generating a processed object by at least combining, based at least on the numerical value, the first object included in the third element and a second object included in a fourth element from the one-dimensional array; and
replacing the first element, the third element, and the fourth element, with a fifth element that includes the processed object.

14. The method of claim 13, wherein the first object and the second object are combined with the condition in the second element to form the processed object in response to the second element being interposed between the third element and the fourth element.

15. The method of claim 13, wherein the first object comprises a grouping that includes a first filter, and wherein the first filter is associated with a parameter for retrieving, from a remote system, one or more data records.

16. A non-transitory computer readable medium including program code, which when executed by at least one data processor, causes operations comprising:
generating, based at least on a tree structure representative of a request, a one-dimensional array representative of the request, the generating of the one-dimensional array comprising:
in response to the tree structure having a first node that corresponds to a section in the request, inserting, into the one-dimensional array, a first element including a numerical value that corresponds to a quantity of children nodes descending from the first node, in response to the first node including a condition that joins the section with another section, inserting, into the one-dimensional array, a second element including the condition, and in response to the tree structure having a second node that corresponds to an object in the request, inserting, into the one-dimensional array, a third element including the object;

parsing the one dimensional array, the parsing includes determining that the first element includes the numerical value, the parsing further includes responding to determining that the first element includes the numerical value by at least combining, based at least on the numerical value, a quantity of elements that are subsequent to the first element in the one-dimensional array, each of the quantity of elements including objects, and the quantity of elements corresponding to the numerical value; and executing the request based at least on the parsed one-dimensional array representative of the request.

* * * * *